United States Patent
Ricci

(10) Patent No.: US 9,594,886 B2
(45) Date of Patent: Mar. 14, 2017

(54) APPLICATION AND OPEN SOURCE INFORMATION TECHNOLOGY POLICY FILTER

(75) Inventor: Christopher Ricci, Cherry Hills Village, CO (US)

(73) Assignee: Avaya Inc., Basking Ridge, NJ (US)

(*) Notice: Subject to any disclaimer, the term of this patent is extended or adjusted under 35 U.S.C. 154(b) by 792 days.

(21) Appl. No.: 12/892,687

(22) Filed: Sep. 28, 2010

(65) Prior Publication Data

US 2011/0302623 A1 Dec. 8, 2011

Related U.S. Application Data

(60) Provisional application No. 61/350,587, filed on Jun. 2, 2010.

(51) Int. Cl.
- G06F 9/445 (2006.01)
- G06F 21/12 (2013.01)
- G06F 21/10 (2013.01)

(52) U.S. Cl.
CPC .......... *G06F 21/121* (2013.01); *G06F 21/105* (2013.01)

(58) Field of Classification Search
None
See application file for complete search history.

(56) References Cited

U.S. PATENT DOCUMENTS

| | | | |
|---|---|---|---|
| 6,810,389 B1* | 10/2004 | Meyer | 705/59 |
| 6,816,842 B1 | 11/2004 | Singh et al. | |
| 8,989,160 B1* | 3/2015 | Marsico | H04L 12/4604 370/338 |
| 2003/0167336 A1* | 9/2003 | Iwamoto et al. | 709/229 |
| 2004/0073634 A1 | 4/2004 | Haghpassand | |
| 2005/0076233 A1* | 4/2005 | Aarts et al. | 713/201 |

* cited by examiner

*Primary Examiner* — Qamrun Nahar
(74) *Attorney, Agent, or Firm* — Sheridan Ross P.C.

(57) ABSTRACT

The present invention is directed to a software distribution architecture in which an enterprise has a filter that screens user requested software, software upgrade(s), software feature(s), and/or software setting option(s) against enterprise rules or policies. Disapproved software, software upgrade(s), software feature(s), and/or software setting option(s) are blocked for download.

22 Claims, 7 Drawing Sheets

| 304 | 308 | 312 | 316 | 320 | 324 | 328 |
|---|---|---|---|---|---|---|
| REQUESTER IDENTITY | REQUESTER CONTEXT | DEVICE TYPE AND/OR DEVICE IDENTIFIER | HARDWARE FEATURES, CAPABILITIES, AND PREFERENCES | SOFTWARE, SOFTWARE UPGRADES, FEATURES, SETTINGS, AND CAPABILITIES | REQUEST HISTORY | DESCRIPTION OF DISPOSITION |

300

FIG. 3

APPLICATION AND OPEN SOURCE INFORMATION TECHNOLOGY POLICY FILTER

CROSS REFERENCE TO RELATED APPLICATION

The present application claims the benefits of U.S. Provisional Application Ser. No. 61/350,587, filed Jun. 2, 2010, entitled "Application and Open Source Information Technology Policy Filter", which is incorporated herein by this reference in its entirety.

FIELD

The invention relates generally to software distribution and particularly to enterprise-specific software distribution.

BACKGROUND

E-commerce has grown in importance, particularly to software vendors. Online software sales have escalated. Purchasing of software over the worldwide Web provides purchasers with the convenience not only of buying software online but also of installing the software without the use of diskettes or optical disks.

While online stores that sell software are well known, they have drawbacks. For example, when a customer accesses an online store, the customer can be overwhelmed by the number of software applications available for purchase. This can prevent the customer from locating and purchasing the applications that are most interesting or applicable to the customer or his/her enterprise. Another drawback is that more than one customer from an enterprise may need to buy applications. This can result in a very large number of accounts for differing members of a single enterprise. This can be problematic both to the enterprise buying the applications and to the seller wishing to collect demographic data on their customers. Another drawback is that online stores allow any application to be purchased and/or licensed and downloaded by a requesting enterprise customer, without regard to the rules of the enterprise of which the user is a member. Yet another drawback is that the majority of application stores are focused on a consumer-market model. Under this model, software is purchased directly by enterprise users using discretionary funds. Popular applications are typically entertainment, ringtones and themes. There is little or no regulation or supervision for such purchases by the enterprise. Yet another drawback is that there are few enterprise focused marketplace solutions. The generally accepted business/delivery model to connect open platform developers to enterprise customers is largely undefined. Unlike other software customers, discretionary purchases are not the primary purchase of enterprise customers. Enterprise customers focus spending on productivity enhancing applications and those targeted for specific verticals. Enterprise customers further desire to purchase applications in bulk rather than have each employee expense them. Yet another drawback is that, when a customer requests information technology ("IT") approval to download a new application, many enterprises have a complex application approval process that is not policy-based or centrally coordinated. Yet another drawback for the vendor is that enterprise vendors are premised on the client-server model where licensing is controlled by the vendor on the server component of the model. Due to piracy and other licensing violations, this can result in many free applications being employed, with a concomitant loss in revenue and transaction fees.

SUMMARY

These and other needs are addressed by the various embodiments and configurations of the present invention. The present invention is directed to a software distribution architecture that is particularly useful for enterprise customers.

In embodiments, a method and system are provided that perform the steps/operations of:

(a) determining, by a processor executable browser monitoring module and based on a browser activity of a requestor, that the requestor intends to download software, a software upgrade, a software feature and/or a software setting option, the requestor being associated with an enterprise other than a software vendor; and (b) comparing, by a processor executable policy and rules engine, a set of policies and/or rules with the software, software upgrade, software feature and/or software setting option to determine whether the software, software upgrade, software feature and/or software setting option should be permitted, wherein the set of policies and/or rules is not directed to any of malware, spyware, or viral threat prevention and rejection.

In yet another embodiment, a method is provided that includes the steps of:

(a) determining, by a processor executable browser monitoring module and based on a browser activity of a requestor, that the requestor intends to download software, a software upgrade, a software feature and/or a software setting option, the requestor being associated with an enterprise other than a software vendor; and (b) comparing, by a processor executable policy and rules engine, a set of policies and/or rules with the software, software upgrade, software feature and/or software setting option to determine whether the software, software upgrade, software feature and/or software setting option should be permitted, wherein the set of policies and/or rules comprise one or more of enterprise information technology guidelines regarding software other than malware, spyware, and viral threat prevention and rejection, open-source license restrictions, entitlements, and/or requirements, closed-source license restrictions, entitlements, and/or requirements, restrictions imposed by financial information, and compatibility restrictions imposed by infrastructure information.

Based on the comparison of the policies and rules, the policy and rules engine blocks downloading when the software, software upgrade, software feature and/or software setting option is not compliant with a policy and/or rule but permits downloading when the software, software upgrade, software feature and/or software setting option is compliant with the set of policies and/or rules.

The embodiments can restrict the download of software in violation of enterprise policies, rules, and guidelines and other enterprise-level restrictions and requirements or of licensing restrictions. It can permit software purchases and downloads to be regulated or supervised by the enterprise. It is no longer a complex problem for an enterprise user or requestor to determine what software is allowed, what software is already licensed, what downloads, such as open source, are permissible, and what software represents a threat to the enterprise. It can provide an easy and convenient download approval process, by automated interaction with information technology personnel and allow conditional access to the software to certain privileged individuals or subgroups, such as legal and/or purchasing personnel, for evaluation of whether a download is suitable for an intended audience.

In other embodiments, an online software store is provided that provides a user with a previously filtered set of software to choose from. The online store, though maintained by a software vendor, may be branded and customized so that it appears to be maintained by the enterprise.

The present invention can provide a number of other advantages depending on the particular configuration. For example, it can provide an online software store, a phone accessible store, or any other electronic store that allows a user to download software and/or software upgrades and/or activate features, and/or change settings in an enterprise-specific way. For example, the software store can be coordinated with the purchasing enterprise's environment, infrastructure, information technology requirements and approval process, account billing, licensing, and other attributes. Employee abuses and other enterprise problems from unregulated software can be significantly reduced. When a customer accesses an online store, the customer is directed to a filtered set of software applications and is not overwhelmed by a large number of software applications for purchase. This can assist the customer in quickly and efficiently locating and purchasing the software applications that are most interesting or applicable to the customer or his/her enterprise. It can provide a central enterprise billing account and obviate the billing problems caused by more than one member of the enterprise purchasing enterprise applications. It can facilitate the collection, by the software vendor and enterprise, of demographic data on enterprise members. It is focused on a new enterprise market model and not a consumer market model. Enterprise customers can purchase software applications in bulk rather than having each employee expense them, thereby providing enterprise customers with substantial cost savings. It can simplify and render more effective the software approval process of the enterprise. It can reduce the likelihood and incidents of software piracy by enterprise members, thereby avoiding software piracy instigated losses in revenue and transaction fees.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer" refers to a machine capable of executing instructions on data and storing the instructions.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

A "cookie" is information stored on a user's computer by a Web browser at the request of software at a web site. Web sites use cookies to recognize users who have previously visited them. The next time the user accesses the site, the information in the cookie is sent back to the site so the information displayed can vary depending on the user's preference.

The term "customer" or "client" denotes a party patronizing, serviced by, or otherwise doing business with the vendor.

The terms "determine", "calculate" and "compute," and variations thereof, as used herein, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The term "enterprise" refers to an organization, whether a corporation, partnership, joint venture, non-profit institution, government entity, or any other type of organization, that uses a computer or other type of computational device. The enterprise is not limited to large organizations but includes organizations of any size. A typical example of an enterprise is a for-profit corporation that possesses a private computer network used in its business operations.

The term "feature" refers to an operational aspect of software or a computational device.

The term "hardware" refers to the physical machines that make up a computer, such as a personal computer, laptop, personal digital assistant, supercomputer, or a collection of computers, such as a network.

The term "malware" refers to software designed with a malicious intent to detrimentally impact a computer or computer system without the owner's and operator's informed consent, such as dishonest adware, computer worms, rootkits, spyware, Trojan horses, viruses, and other malicious and unwanted software.

The term "module" refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "open source software" refers to computer software that is available in source code form for which the source code and certain other rights normally reserved for copyright holders are provided under a software license that permits users to study, change, and improve the software. Open Source licenses commonly grant licensees the right to copy, modify and redistribute source code (or content). These licenses may also impose obligations (e.g., modifications to the code that are distributed must be made available in source code form, an author attribution must be placed in a program/documentation using that Open Source, etc.).

The term "presence information" refers to any information associated with a network node and/or endpoint device, such as a communication device, that is in turn associated with a person or identity. Presence information can indicate user status (e.g., online or offline), user availability (e.g., available, busy, on the phone, or out to lunch), user's desired contact means (e.g., instant messaging, circuit-switched telephone, packet-switched telephone, cell phone, pager, etc.) that may vary by contactor identity and/or contact time, and at what endpoint a contactor is most likely to reach successfully the presence service subscriber. Presence information can span a number of different communication channels. The aggregated view of a user's presence (that is, the availability across all of an individual's SIP-enabled devices) is called Multiple Points of Presence or MPOP. Examples of information useful in determining a user's presence and availability include information regarding the accessibility of the endpoint device, the recency of use of the endpoint device by the person, recency of authentication by the person to a network component, recency of registration of an endpoint device, an endpoint publishing presence information, SUBSCRIPTION requests generated by a user agent in the user's endpoint device, geographical location of the user using mobile device location information, scheduled activities on the user's calendar, indications whether or not a user has been reading or sending email, and an indication whether the user's email application has an out of office setting. Present information can be, for example, the electronic address of a device at which the service subscriber is currently deemed to be present and/or available.

The term "software" refers to an executable program that tells a computer what to do. In enterprise situations, a software application is a typical example of software.

The term "software application" or "application" refers to a computer program that performs useful work, generally unrelated to the computer itself. Examples of software applications include word processors, spreadsheets, accounting systems, and telecommunication programs. "Software applications" include not only the application itself but also upgrades to the application and settings and features of the application.

The term "synchronized" means, in the context of databases, maintaining selected fields in the records of one database temporally up to date with respect to changes in the information stored, by the other database, in the selected or equivalent fields.

The term "VoIP" refers to a family of transmission technologies for delivering packetized voice communications over IP networks such as the Internet or other packet-switched networks, rather than the public switched telephone network (PSTN). Other terms frequently encountered and synonymous with VoIP are IP telephony, Internet telephony, voice over broadband (VoBB), broadband telephony, and broadband phone. Common protocols for VoIP include H.323 and the Session Initiation Protocol.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

FIG. 3 is a set of data structures according to an embodiment;

DETAILED DESCRIPTION

Figure 1:
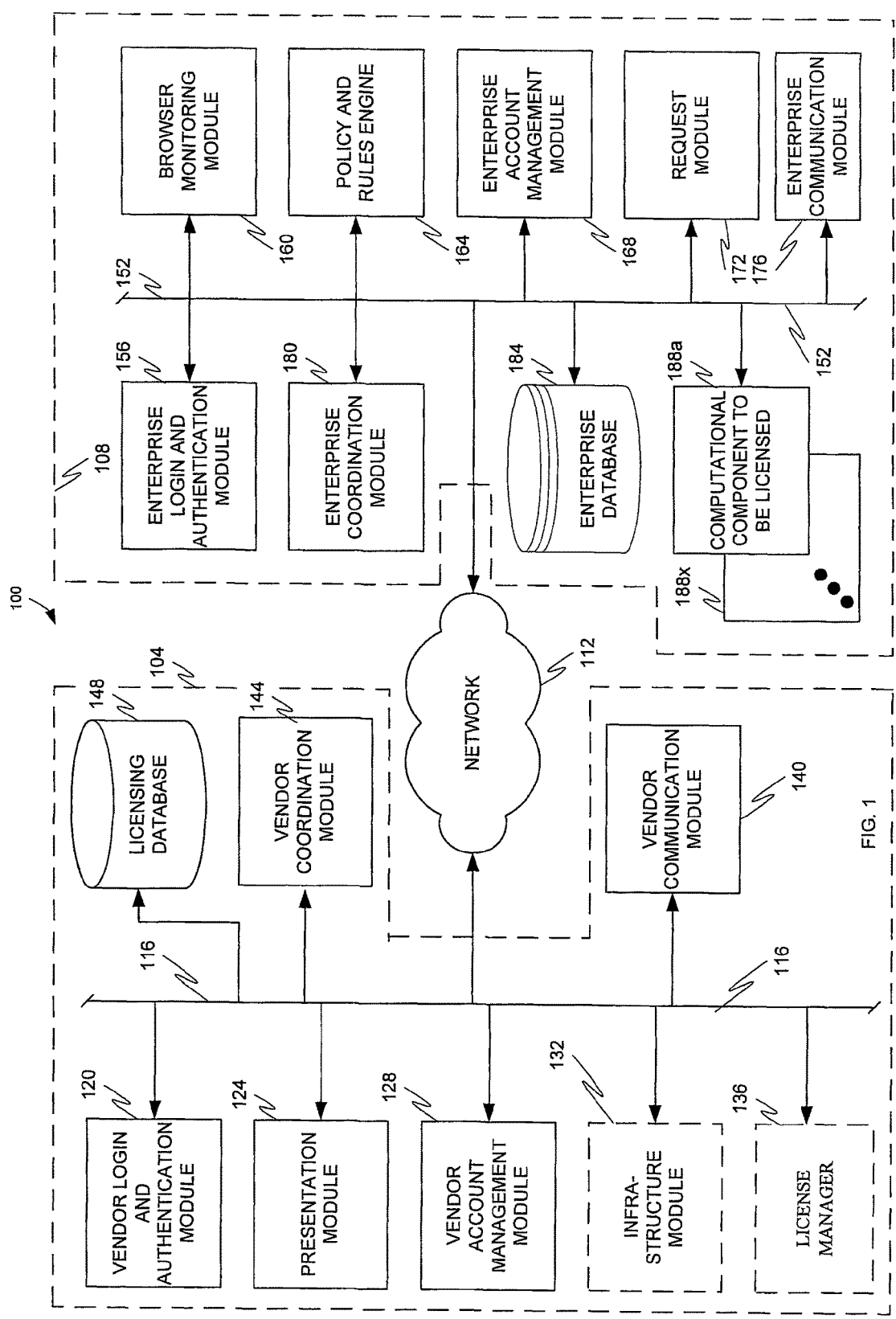
FIG. 1 is a block diagram of a computational system according to an embodiment.

This disclosure describes vendor and enterprise systems that cooperatively facilitate, monitor, and control the purchase or acquisition of software, software upgrade(s), software feature(s), and/or software setting(s) by enterprise members. The vendor system can provide the customer, or software requestor, with content that is customized or pre-configured for the enterprise of which the customer is part. The content, for example, is tailored with regard to the devices, systems, and/or other infrastructure that the enterprise system possesses. The content, by way of illustration, can be a company-branded display having a filtered listing of software, software upgrade(s), software feature(s), and/or software setting(s) available for download by the respective company's employees. The vendor system can have an enterprise account permitting enterprise members the opportunity to select and download pre-approved software, software upgrade(s), software feature(s), and/or software setting(s). The enterprise system can include a software download filter that uses enterprise policies, software licensing agreements, open source and free software policies, and/or security guidelines to filter software, software upgrade(s), software feature(s), and/or software setting(s) requested by an enterprise member. The arrangement is made possible by the existence of an agreement between the enterprise customers and vendor that specifies and defines the terms of use by the enterprise customer of the vendor system.

The various embodiments and configurations in this disclosure will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any application in which it is desirable to collect and associate related and temporally changing multimedia information for presentation to a user.

The Vendor and Enterprise Systems

The computational system 100 includes software vendor and enterprise systems 104 and 108 connected by a data processing network 112. The data processing network 112 can be any suitable network, whether trusted or untrusted and whether public or private and is typically a packet-switched public network.

The Vendor System 104

The vendor system 104 includes a number of components interconnected by internal, commonly private, network 116.

A vendor login and authentication module 120 authenticates members of the enterprise by any suitable methodology, such as symmetric cryptographic identification methods (e.g., using symmetric secret key(s)), asymmetric cryptographic identification methods (e.g., using asymmetric keys), digital signatures, one-way functions, two-way functions, and user credentials (such as a login name and password). The vendor login and authentication module 120 not only identifies requestors but also associates requestors with a corresponding enterprise identifier and, optionally, satellite office identifier, thereby allowing enterprise members to access the software, software upgrade(s), software feature(s), and/or software setting(s) specific to the corresponding enterprise and/or enterprise satellite office. For instance, authentication can enable a first set of members of a first enterprise to be locked out of an application store associated with a second set of members of a different second enterprise or, alternatively, a first set of members of a first enterprise satellite office to be locked out of an application store associated with a second set of members of a second enterprise satellite office (both the first and second enterprise satellite offices being part of a common enterprise).

A presentation module 124 selects enterprise-specific content to be presented by a suitable technique to a requestor. Typically, each enterprise has associated content to be presented, by any suitable interface (e.g., a computer display, an audio or video channel on a telephone, etc.), to its respective members. For example, a first enterprise, first satellite office of a first enterprise, or first type of enterprise has first content to be presented to its respective members, and a different second enterprise, second satellite office of the first enterprise, or second type of enterprise, respectively, has second content to be presented to its respective members, with the first and second content being different.

Content corresponding to a selected enterprise is commonly a function of multiple factors. Examples of factors include: prior approval by the enterprise of the software, software upgrade, software feature, and/or software setting for use by enterprise members; the software used by at least one of the requestor and another enterprise member; the hardware used by at least one of the requestor and another enterprise member; rules, policies, and/or guidelines of the enterprise; financial arrangements between the vendor and enterprise; an agreement between the vendor and enterprise; and context of the requestor; and other factors.

A vendor account management module 128 manages and enforces financial agreements between the vendor and each enterprise and other arrangements (e.g., purchase orders, credit or account limits, prepayment records, account balances, and other financial constraints) (hereinafter "financial information") for each enterprise. The vendor account management module 128 also requests from suitable IT and/or financial personnel and/or automated module(s) in the enterprise permission to purchase a software, software upgrade(s), software feature(s), and/or software setting(s) when the proposed purchase falls outside of or is otherwise barred by the financial information. Finally, the vendor account management module 128 identifies and interacts with authorized personnel in the vendor and/or enterprise to adjust or edit the financial information.

An infrastructure module 132, which may be located in the enterprise system 108, uses a combination of purchase history, presence information for enterprise members, and information provided by or on behalf of enterprise IT personnel to provide a description of the infrastructure of the enterprise system 108 and determines, based on the infrastructure, what software, software upgrade(s), software feature(s), and/or software setting(s) are compatible, incompatible, desirable, and/or undesirable and therefore available or unavailable for the authenticated requestor and/or the requestor's enterprise. Examples of infrastructure include the hardware, hardware features, and/or hardware settings and/or software, software upgrades, software features, and/or software settings in internal network(s) 152 and any external network(s) (not shown) of each enterprise, network topology description, and the like. The infrastructure may be shown not only for the enterprise as a whole but also (or alternatively) as a function of one or more of satellite and main office location(s) of the requestor, job title description, and/or hierarchy level of the requestor, degree of importance of the requestor to the enterprise, work unit of the requestor (such as departments, groups, teams, and other work units), and/or interpersonal working relationship(s) of the requestor (showing which individuals inside and/or outside of the enterprise frequently and/or infrequently interact with one another).

A license manager 136, which may be located in the enterprise system 108, monitors and enforces compliance with licensing requirements, entitlements, and restrictions. Examples of licensing requirements, entitlements, and restrictions include, for example, activation and deactivation of features, numeric restrictions, version or release restrictions, product or device identifier restrictions, and the like. In a telecommunication system, for example, licensing requirements, entitlements, and restrictions include seat or nodal number restrictions; on/off restrictions such as abbreviated dialing enhanced list, audible message waiting, vectoring, answer supervision by call classifier, ATM trunking, agent states, dial by name, DCS call coverage, echo cancellation, multifrequency signaling, and wideband switching, Digital Communication System or DCS call coverage, audible message waiting, vectoring, attendant vectoring, Asynchronous Transfer Mode or ATM WAN spare processor, ATM, dial by name, echo cancellation, multimedia call handling, multiple call handling, caller identification, multifrequency signaling, Integrated Services Digital Network or ISDN network call redirection, centralized attendant, remote office, enhanced Direct Inward Dialing or DID routing, survivable remote processor, time of day routing, tenant partitioning, hospitality announcements, Vector Directory Number or VDN of origin announcement, wideband switching, and wireless; numeric and name features such as logged-in agents, offer category, maximum numbers of concurrently registered IP stations, maximum administered IP trunks, offer category, maximum number of ports, maximum number of administered remote office trunks, and maximum number of mobile stations; and value features, such as product value (e.g., corresponding to a product name or type), a release number (e.g., referring to a product release identifier), and numeric value(s) (e.g., indicating an operational parameter associated with the product and/or release, such as how many ports are licensed, how many licenses for the product are granted, how many concurrent users are allowed, and/or how many stations can be concurrently administered with the feature), and the like.

A vendor communication module 140 identifies appropriate contactees in the enterprise and sets up secure and insecure communication sessions, such as VoIP, email, and instant messaging sessions, with the contactees (which can be individuals and/or automated components). For example, the vendor communication module 140 can communicate with the enterprise database (discussed below), via a database management system (not shown), to access a buyer's list, company directory, network infrastructure information, and the like.

A vendor coordination module 144 coordinates, at the control level, the functions and operations of the modules discussed above.

A licensing database 148 can be any database, whether relational, post-relational, or object-oriented, that contains information incidental to the operation of the vendor. Such information includes license requirements, entitlements, and restrictions, serial numbers, customer sales history, customer information (such as enterprise infrastructure, financial information, customer contact information, and customer demographic information), enterprise-specific content, keys, credentials, and the like. The licensing database 148 can be partitioned to maintain independently and securely the confidential records of different enterprise customers of the vendor.

The license manager 136 coordinates, particularly for prepaid licenses, with the enterprise system 108 to make appropriate changes and updates to the corresponding enterprise records in the licensing database 148 when an appropriate change is requested by the enterprise system 108. For example, the enterprise system 108 may request a feature to be activated or deactivated on a computational component to be licensed 188a-x, a setting to be altered for a computational component to be licensed 188a-x or for an enterprise communication server (not shown), and licensed software to be associated with a first computational component to be licensed 188a and, as a consequence, unassociated with a second computational component to be licensed 188b. In one configuration, the license manager 136 limits what is available based on what is installed and/or licensed. In one configuration, applications that are deemed to be consistent with security parameters of an enterprise, whether currently licensed or not, are made available to requesting enterprise members.

The Enterprise System 108

The enterprise system 108 includes a number of components interconnected by internal, typically private, network 152.

An enterprise login and authentication module 156 authenticates members of the enterprise by any suitable methodology, such as symmetric cryptographic identification methods (e.g., using symmetric secret key(s)), asymmetric cryptographic identification methods (e.g., using asymmetric key(s)), digital signatures, one-way functions, two-way functions, and user credentials (such as a login name and password). The enterprise login and authentication module 156 not only identifies requestors but also associates requestors with a corresponding enterprise identifier and, optionally, satellite office identifier.

A browser monitoring module 160 monitors the browser activity of enterprise members to identify a trigger event, which indicates that the monitored member is intending to download software, software upgrade(s), software feature(s), and/or software setting(s). In one configuration, the browser monitoring module 160 determines when members of an enterprise are logged in and using their browser where the application should be invoked. The browser monitoring module 160 can use one or more events in identifying a trigger event, such as cursor activity (e.g., the user has highlighted and/or selected an icon or link associated with software, software upgrade(s), software feature(s), and/or software setting(s)), the Uniform Resource Locator ("URL") of a visited Website (that has been previously identified as providing software, software upgrade(s), software feature(s), and/or software setting(s) for download), establishment or attempted establishment of a secured communications channel (e.g., as a precursor to a software purchase), contents of a cookie, electronic shopping cart contents, received/displayed Webpage contents, and the like.

A policy and rules engine 164 receives input from IT, corporate security, legal personnel, purchasing personnel, open source resources, and the like to create a set of policies and rules that cover software, software upgrade(s), software feature(s), and/or software setting(s) downloading for the enterprise. Examples of policies and rules include the enterprise IT guidelines regarding security, compatibility, and other factors, open- or closed-source license restrictions, entitlements, and requirements, restrictions imposed by financial information, restrictions imposed by infrastructure information, and the like. In the case of open source license restrictions, entitlements, and requirements, conditions of use and other questions could be provided to the browser, which would locate on the web answers to the questions. The answers would be compared with policy guidelines, which in turn would drive download or blocking activity. The policy and rules engine 164 could be on a server separate from one or more of the other enterprise modules that is maintained by enterprise IT personnel.

In one configuration, the policy and rules engine 164 passes only those software, software upgrade(s), software features, and/or software settings that IT personnel have allowed and preapproved. The policy and rules engine 164 thus knows, in advance, the licenses that the enterprise has already paid for and others that it is willing to pay for if an enterprise member wants the corresponding software, software upgrade(s), software feature(s), and/or software setting(s).

In one configuration, the policy and rules engine 164 allows download of free or open source applications or other software based on pertinent policies and rules. In the case of open source code, the policy and rules engine 164 may need to be interactive to account for specific intended uses and/or current and future installations for the software. A series of compliance questions could be rendered for the vendor system's use and, based on the answers provided, the policy and rules engine 164 could decide on whether the use is approved.

In one configuration, software, software upgrade(s), software feature(s), and/or software setting(s) deemed by the policy and rules engine 164 (and/or IT personnel) to be consistent with security parameters of the enterprise, whether licensed or not, would be made available to enterprise members. This security filtering is not the commonly known malware, spyware, or viral threat prevention or rejection. It is a security screen in terms of whether use of the software, software upgrade(s), software feature(s), and/ or software setting(s) is consistent with overall security of the enterprise, which could include connectivity (e.g., does it raise compatibility issues or otherwise impair connectivity with selected internal or external components), communications (e.g., does it raise compatibility issues or otherwise impair communications of enterprise members with other entities), and/or other infrastructure considerations.

An enterprise account management module 168 manages and enforces financial agreements between the enterprise and vendor(s) and financial information for the enterprise. The enterprise account management module 168 also requests permission, from suitable IT and/or financial personnel and/or automated module(s) in the enterprise, to purchase software, software upgrade(s), software feature(s), and/or software setting(s) when the proposed purchase falls outside of or is otherwise barred by the financial information. Finally, the enterprise account management module 168 identifies and interacts with authorized personnel in the vendor and/or enterprise to adjust or edit the financial information.

A request module 172 allows an enterprise member to request that new software, software upgrade(s), software feature(s), and/or software setting(s) be added to an approved list (white list) or disapproved list (black list). It is also possible to have a conditionally approved list (gray list) where the software, software upgrade(s), software feature(s), and/or software setting(s) is approved only for certain requestors and not for others due to a difference in the requestors. The request module 172, along with an enterprise communication module 176, links the appropriate parties in the enterprise, via whatever media, that would be appropriate to the urgency such as by instant messaging, email, or VoIP, to discuss software, software upgrade(s), software feature(s), and/or software setting(s) to be included on one of the lists. For instance, the request module 172 and enterprise communication module 176 could effect approval through an email process or a HyperText Markup Language ("HTML") pop up on the computational component of the requestor.

The enterprise communication module 176 identifies appropriate contactees in the enterprise and/or vendor and sets up secure and insecure communication sessions, such as VoIP and instant messaging sessions, with the contactees (which can be individuals and/or automated components). For example, the enterprise communication module 176 can communicate with the licensing database 148 (discussed above), via a database management system (not shown), to access the customer records of the enterprise.

An enterprise coordination module 180 coordinates, at the control level, the functions and operations of the modules discussed above.

An enterprise database 184 can be any relational, post-relational or object-oriented database. The enterprise database 184 stores detailed information about the operations of the enterprise, including personnel databases that hold information such as salary, benefits, skills data, job descriptions and titles, contact information, and presence information about employees, enterprise financial information, enterprise infrastructure information, and the like.

The computational component(s) to be licensed 188a-x can be any computational device to which the selected software, software upgrade(s), software feature(s), and/or software setting(s) is/are to be downloaded. Examples of computational component(s) to be licensed 188a-x include personal computers, laptop computers, Personal Digital Assistants (PDAs), wireless (e.g., cellular) phones, wireline telephones, and the like.

As will be appreciated, the above modules and components can be centralized or distributed. They can be external and/or internal to the vendor's or enterprise's firewall and can be augmented by external cloud resources.

Data Structures in Database(s) 148/or 184

FIG. 3 shows a set of data structures 300 in the licensing and/or enterprise database 148 and 184. The requestor identity 304 refers to an identifier associated with the requestor, such as name, employee identification number, electronic address of the requestor and/or the requesting device, and the like. Requestor context 308 refers to the context of the requestor. Examples of requestor context 308 include current location of the requestor, current device being used by the requestor, satellite and/or main office location(s) of requestor, job title or hierarchy level of requestor, job description of requestor, work unit (such as department, group, team, and other work unit) associated with requestor, and/or interpersonal working relationship of requestor (showing which individuals inside and outside the enterprise frequently and/or infrequently interact with the requestor). The device type and/or device identifier 312 refer to the set of computational components to be licensed 188a-x to which the software, software upgrade(s), software feature(s), and/or software setting(s) is/are to be downloaded. The hardware features, capabilities, and preferences 316 refer to the features, capabilities, and user preferences of each member of the set of computational components to be licensed 188a-x. Device capabilities include, for example, screen size, CPUs, random access memory capacity, volatile memory capacity, nonvolatile memory capacity, total memory capacity, compatible and/or hosted communication applications, compatible and/or hosted communication clients, operating system, port configurations, wireless communication capabilities, compatible wired and wireless communication and data protocols, codecs, bandwidth, voice capabilities, video capabilities, text capabilities, and Web capabilities. The software, software upgrades, features, settings, and capabilities 320 refer to software upgrades, features, settings, and capabilities of the software executed by each member of the set of computational components to be licensed 188a-x. Examples of software, software upgrades, features, settings, and capabilities 320 include those mentioned above in connection with telecommunication software. The request history 324 includes a timestamp and description of each request received from each member of the enterprise. The description can include requestor name and a description of the request, including an identification of the software, software upgrade(s), software feature(s), and/or software setting(s) requested. The description of the disposition 328 includes an indicator of the disposition, e.g., granted or denied. The same or different ones of the data structures can be maintained on the licensing and enterprise databases 148 and 184. The licensing and enterprise databases 148 and 184 would be synchronized by known techniques to avoid conflicts.

Functions of the Vendor and Enterprise Systems 104 and 108

An account of an enterprise in the vendor system 104 is created typically in a default vendor's store (e.g., store.software.com), which then allows customization. For larger entities, the credit card, purchase order or other account number would be a customer identifier or number, and any purchases would be billed in accordance with standard billing practices. To verify who is allowed to create an account, the vendor account management module 128 accesses, by the enterprise coordination module 180, personnel information in the enterprise database 184 or otherwise verifies, by the vendor login and authentication module 120, the account creator by a manual verification process. Monitoring the account would allow tracking of purchases or purchase requests either by the vendor account management module 128 or enterprise account management module 168.

Examples will now be provided to illustrate operations of the vendor and enterprise systems 104 and 108.

In a first example, a member, or requestor, of a first enterprise requests a web page from the vendor system 104. The vendor system 104 identifies the requestor, such as by a cookie, login information received by the vendor login and authentication module 120 from the requestor, or other information input by the requestor (e.g., inputting the name or identifier of the first enterprise), or otherwise associates the requestor with the first enterprise. The presentation module 124, in response, selects, from among a plurality of different sets of web pages, each set being associated with a different enterprise, a set of web pages corresponding to the first enterprise. The content of the selected set of web pages is tailored to, or a function of, the devices, systems, and other infrastructure of the requestor and/or first enterprise. Alternatively, the selected set of web pages is a function of some other parameter specific to the first enterprise, such as satellite office of the requestor, working unit of the first enterprise of which the requestor is a part, and/or the enterprise employees and/or enterprise customers or clients with whom the requestor frequently corresponds.

Figure 2:
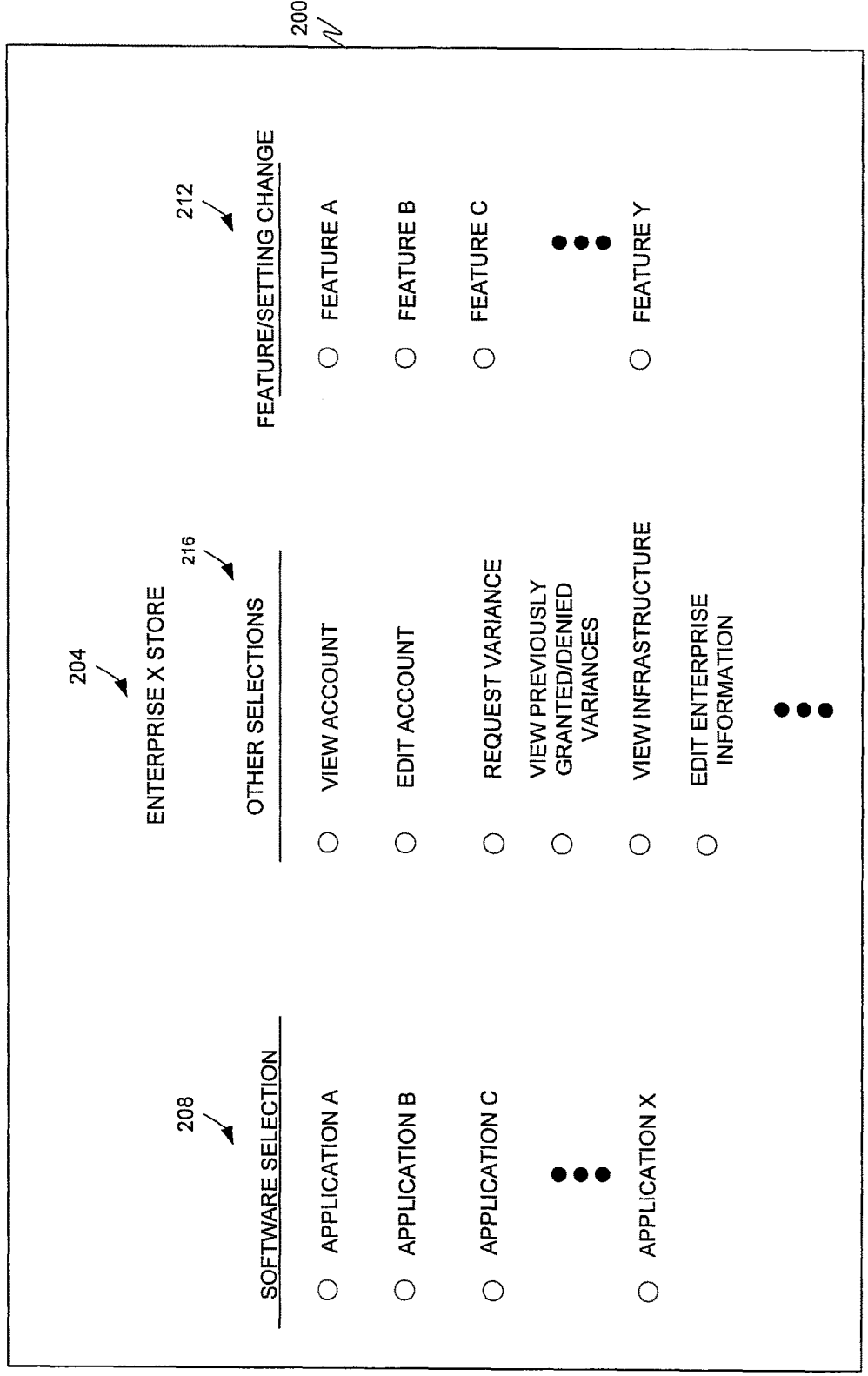
FIG. 2 is a screenshot of a display according to an embodiment.

An illustration of specific content provided by the vendor system 104 to a software requestor of the enterprise, as part of the selected set of web pages, is depicted in FIG. 2, which illustrates a display 200 that is branded and is part of a structured store specific to a company, namely "Enterprise X" (see field 204). The display 200 is driven by the devices, systems, and/or other infrastructure that the company has purchased or otherwise possesses. "Software Selection" 208 lists the various software applications and upgrades available for selection by the authenticated requestor. "Feature/Setting Change" 212 lists the various features and settings that may be selected by the requestor. The software selection and feature/setting change fields 208 and 212 are managed, individually or collectively, by the vendor account management module 128, infrastructure module 132, and license manager 136 in the vendor system 104 and/or by the policy and rules engine 164 in the enterprise system 108. "Other Selections" 216 provides various options to the requestor. "View account" permits the requestor to view the enterprise account information. "Edit account" permits the requestor to communicate with the vendor account management module 128 to edit the account information, such as be increasing or decreasing account limits. The "View account" and "Edit account" fields are controlled by the vendor and/or enterprise account management modules 128 and 168. "Request Variance" permits the requestor to request a variance from the account limits and/or software selection 208 and feature/setting change 212 fields. Depending on the nature of the request, the request is handled by one or more of the vendor account management module 128, infrastructure module 132, and license manager 136 in the vendor system 104 and/or the enterprise account management module 168, and policy and rules engine 164 in the enterprise system 108. "View Previously Granted/Denied Variances", which is typically provided by the request module 172, permits the requestor to view previously granted and/or denied variance requests by himself and/or other enterprise members. "View infrastructure" permits the requestor, if privileged, to interact with the infrastructure module 132 to view the current infrastructure of the enterprise. Finally, "Edit Enterprise Information" permits the requestor, if privileged, to edit the enterprise information, including infrastructure, shown in the licensing database 148 for the enterprise.

In one configuration, the various web pages constituting the content corresponding to an enterprise are grouped into subsets, each subset corresponding to a product, service, satellite office, subsidiary, related company, work group, or infrastructure associated with the enterprise. Each subset of content would be different. For instance, the web pages in the first subset would have a different appearance than the web pages in the second subset. The web pages of the different enterprises or satellite offices can include different display elements, including icons, wall paper, themes, backgrounds, color schemes, color combinations, screen savers, buttons, font sizes, appearances, and/or settings.

In one configuration, the various web pages constituting the content corresponding to an enterprise has a URL that is configured to reflect a unique characteristic of the enterprise system 108. For instance, the URL could include an identifier of the enterprise, such that different vendor system 104 URLs associated with content of different enterprise systems 108 each include an identifier of a different enterprise. The identifier can indicate the name of the respective enterprise, a product or service offered by the respective enterprise, or other infrastructure possessed by the respective enterprise.

In other configurations, the vendor system 104 does not have specific sets of web pages, or content, customized for different enterprises that are presented to the requestor at the outset. The presentation module 124 provides initially default content, typically one or more default web pages, to the requestor. The default content can be a variety of configurations that are presented to the user that solicit and/or are based on answers to qualifying questions. The user accesses specific enterprise-customized content by entering the name of his or her enterprise or by presenting the user with a specific store, such as "Store.EnterpriseX.com/my_company".

The content, in one configuration, reflects only that software and software upgrades that the enterprise system 108 (e.g., enterprise IT personnel) has allowed and preapproved. The content reflects all of the licensed software and software upgrades that the enterprise has paid for and other currently unlicensed applications that the enterprise is willing to pay for when and if an enterprise member elects to purchase the applications. The content may or may not have free applications and upgrades.

In another example, the content includes software, software upgrade(s), software feature(s), and/or software setting(s) that are not pre-approved or pre-filtered by the respective enterprise. If an enterprise member were to request downloading or purchase of software, software upgrade(s), software feature(s), and/or software setting(s) that have not been preapproved, the download can be suspended, delayed, or completed (but deactivated or not installed) pending approval by the enterprise system 108 (e.g., by the policy and rules engine 164 and/or IT personnel). An approval request would be generated and sent by the vendor system 104 to the request module 172 for presentation to appropriate enterprise entities, such as the policy and rules engine 164 or IT personnel. Alternatively, the request can be generated by the request module 172 based on a stimulus or trigger event identified by the browser monitoring module 160. When the software, software upgrade(s), software feature(s), and/or software setting(s) is/are downloaded pending approval, the purchase, such as by credit card, purchase order, or otherwise, would be conditionally completed, without having already obtained IT approval. When the software, software upgrade(s), software feature(s), and/or software setting(s) is/are downloaded pending approval, free software, software upgrade(s), software feature(s), and/or software setting(s) could be downloaded freely.

The request module 172 and/or enterprise coordination module 180 could maintain a whitelist of previously approved software, software upgrade(s), software feature(s), and/or software setting(s), a graylist of conditionally approved or denied software, software upgrades, software features, and/or software settings, and/or a blacklist of previously disapproved software, software upgrade(s), software feature(s), and/or software setting(s) to expedite the approval process. Such a list could be generated from the data structures shown in FIG. 3.

As shown by the data structures of FIG. 3, the policy and rules engine 164 can consider a number of factors in deciding whether or not to approve a requested software, software upgrade(s), software feature(s), and/or software setting(s) purchase and/or download. The factors include requestor context 308, device type and/or identifier 312, hardware features, settings, and capabilities 320, and software, software upgrades, features, settings, and capabilities 320. Thus, a first enterprise member can receive a first set of software application selections 208 and/or feature/setting changes while a second enterprise member of the same enterprise receives a second, different set of software application selections 208 and/or feature/setting changes 212. This difference can be, for instance, because of differences in job responsibilities or levels of the first and second enterprise members, working units of the first and second enterprise members, work locations of the first and second enterprise members, customer relationships of the first and second enterprise members, device types and/or identifiers 312 associated with the first and second enterprise members, hardware features, capabilities, and preferences 316 of communication devices used by the first and second enterprise members, software, software upgrades, software features, software settings, and capabilities 320 of software used by the first and second enterprise members, and the like.

In another example, an enterprise employee is browsing a website associated with the vendor system 104. The website contains applications for download. The enterprise login and authentication module 156 would detect the identity of and permission levels of the employee when the employee is authenticated, and the browser monitoring module 160 would monitor the employee's browser activity. When the employee clicked or otherwise selected software for download, the policy and rules engine 164 would, in cooperation with the enterprise account management module 168, determine whether the download is consistent with enterprise corporate policy. When the software, software upgrade(s), software feature(s), and/or software setting(s) download is permissible, the download would continue. When the download is not permissible, the enterprise coordination module 180 would inform the employee that the operation was blocked and could advise the reason for the blockage (e.g., under what policy or rule it was blocked). The employee could decide based on the notification either to request a new addition to the approved whitelist via the request module 172 or not further pursue the download. When the employee decides that he or she wants to request an addition to the whitelist, there could be a questionnaire provided, with addressing, to those parties needed to rule on the request. Answers to the questionnaire could be provided by the vendor system 104 or by a search performed by the enterprise coordination module 180. Alternatively or additionally, the questionnaire could be completed by the requestor.

In another example, an enterprise system 108 is associated with a website carrying the enterprise branding. Multiple software vendor systems 104 provide content to the website so that their software is provided to enterprise members, such as via the webpage of FIG. 2. When a member clicks on a link, the request is forwarded to the appropriate vendor system 104 for processing. Thus, on a common webpage multiple selectable links direct the enterprise member to multiple different vendor systems 104 associated with different software, software upgrade(s), software feature(s), and/or software setting(s) and/or other products. The website may be maintained by or on behalf of the enterprise, such as by a contractor.

In another example, the enterprise member selects software, software upgrade(s), software feature(s), and/or software setting(s) from a vendor system 104 and designates a specific computational component to be licensed 188 for software, software upgrade(s), software feature(s), and/or software setting(s) installation. Even though the enterprise member is using a different computational component, the enterprise coordination module 180 causes the software, software upgrade(s), software feature(s), and/or software setting(s), if approved, to be downloaded onto the designated computational component to be licensed 188a-x.

In another example, an enterprise member selects an upgrade to an existing software, software upgrade(s), software feature(s), and/or software setting(s) possessed by multiple enterprise members. The request module 172 obtains, from the policy and rules engine 164 and/or from IT personnel, permission to download and install the upgrade. While the upgrade can be added as a software selection 208 to the branded display 200, the enterprise coordination module 180 can also determine what enterprise members can use the upgrade and automatically purchase, download, and install the upgrade on the computational component(s) to be licensed 188a-x of the selected member(s). Alternatively, the enterprise coordination module 180 can forward to the enterprise members a notification that the upgrade is available and that they are preapproved to purchase, download, and install the upgrade. This example is not limited to software upgrades but applies to software, features, and settings.

Operational Logic of the Vendor and Enterprise Systems

Figure 4A:
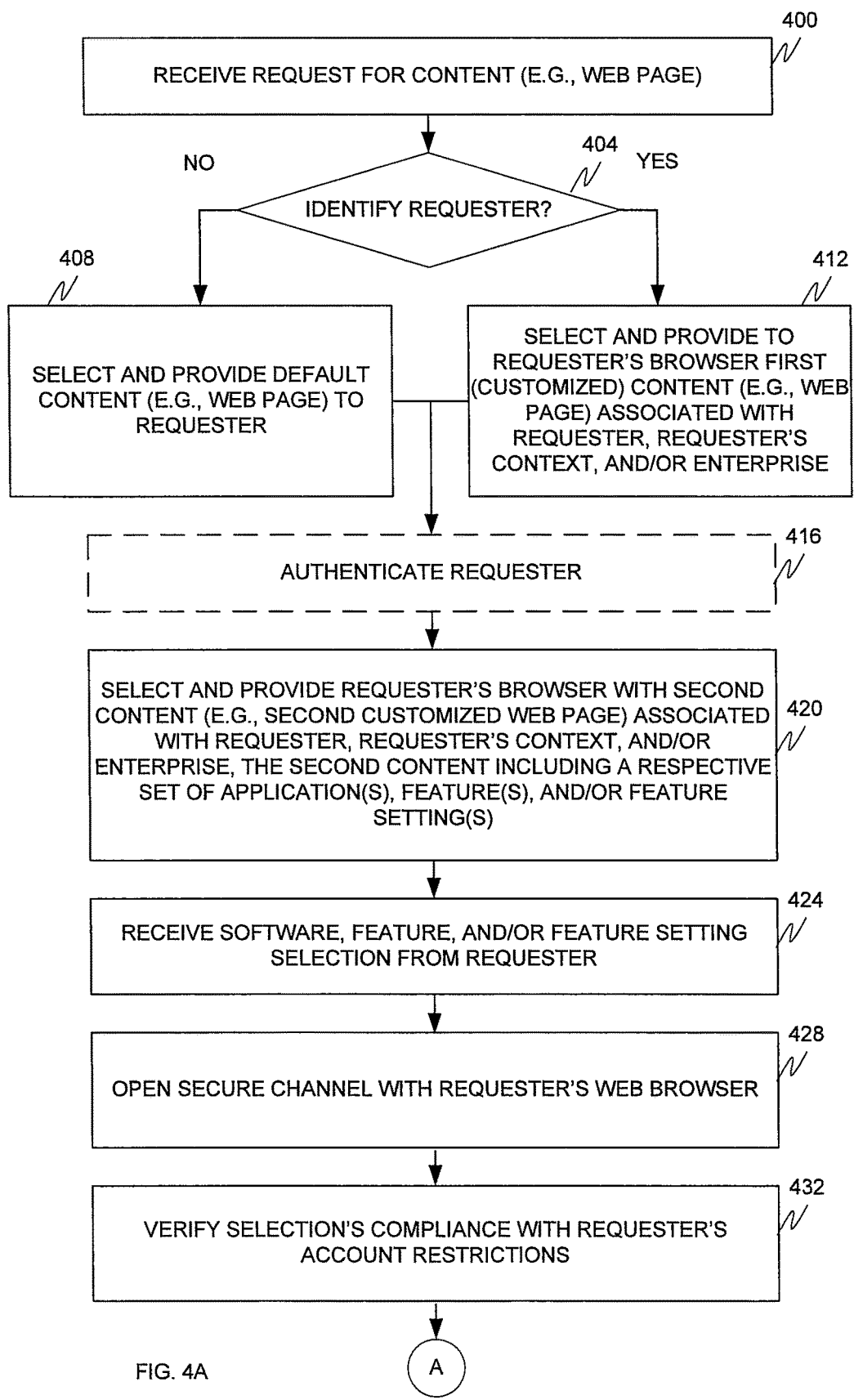
FIGS. 4A-B depict a process flow chart according to an embodiment.
Figure 4B:
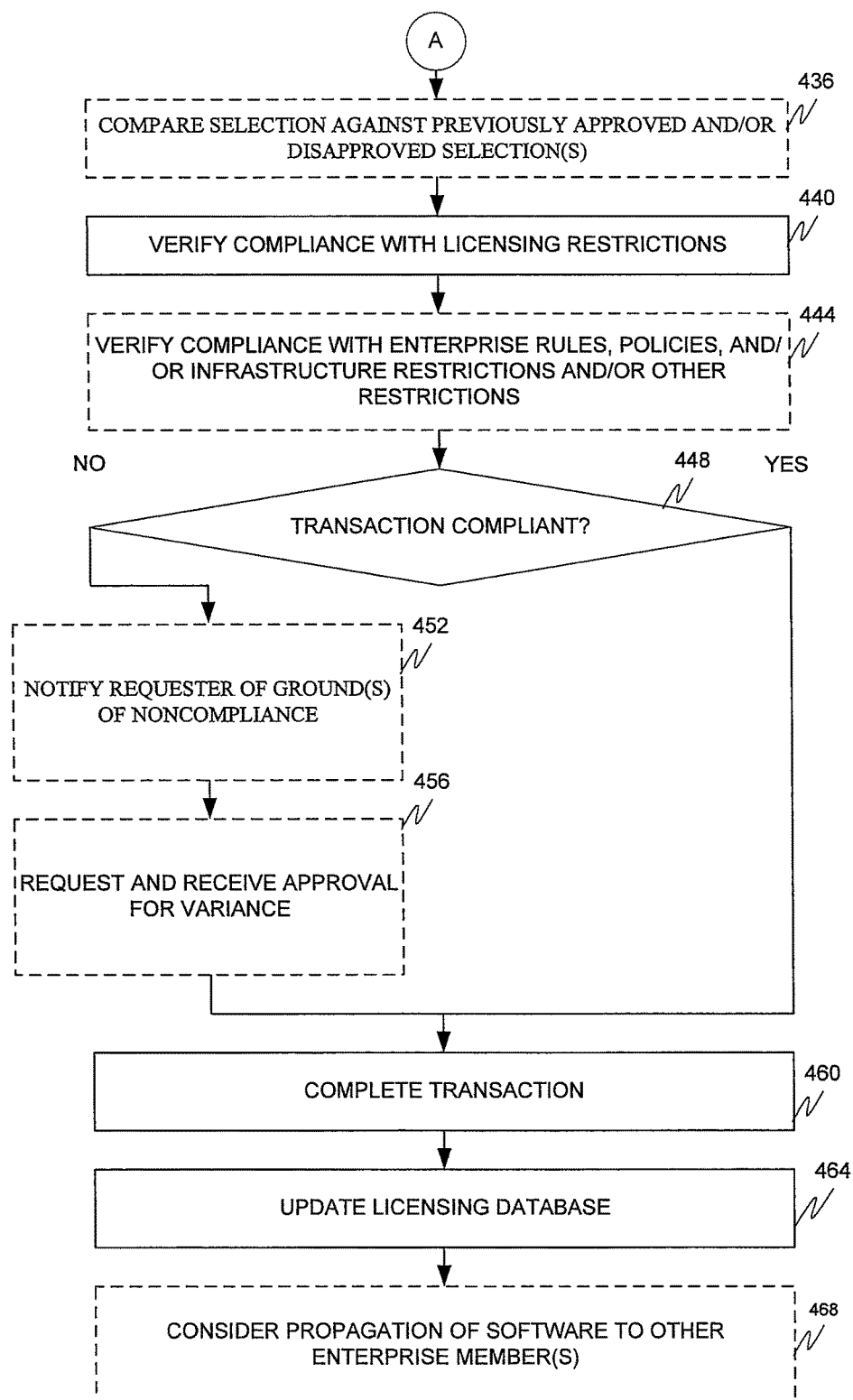

An embodiment of the operation of the vendor, and enterprise systems 104 and 108 will now be discussed with reference to FIGS. 4A-B.

In step 400, the vendor system 104 receives a request for content, such as a web page, from a requestor who is a member of an enterprise associated with enterprise system 108.

In decision diamond 404, the vendor login and authentication module 120 determines whether the requestor can be identified. When the requestor is identified, the presentation module 124, in step 412, selects and provides to the requestor's browser a first content (such as a customized webpage) that is associated with the requestor, the requestor's context, and/or enterprise. When the requestor is not identified, the presentation module 124, in step 408, selects and provides default content (such as a default webpage) to the requestor. The default content typically includes various fields for completion by the requestor to enable identification of the requestor, requestor's location, and/or requestor's enterprise.

After performing step 408 or 412, the vendor login and authentication module 120 optionally authenticates the requestor.

In step 420, the presentation module 124 selects and provides to the requestor's browser second content (e.g., a second customized web page) associated with the requestor, the requestor's context, and/or the requestor's enterprise. The second content includes a respective set of software, software upgrade(s), feature(s), and/or feature setting(s).

In step 424, the vendor system 104 receives a software, software upgrade, feature, and/or feature setting selection from the requestor.

In step 428, the vendor communication module 140 opens a secure channel between the vendor system 104 and the requestor's web browser.

In step 432, the vendor account management module 128 verifies compliance of the selected software, software upgrade, feature, and/or feature setting ("requestor selection(s)") with the requestor's account restrictions.

In optional step 436, the vendor account management module 128 compares the requestor selection(s) against previously approved and/or disapproved selection(s) of the same or other requestors to determine whether the selection(s) are acceptable or unacceptable from the viewpoint of the enterprise system 108.

In step 440, the license manager 136 verifies that the requestor selection(s) complies with licensing requirements, entitlements, and restrictions.

In step 444, the vendor coordination module 144 receives confirmation from the infrastructure module 132 in the vendor system 104 and/or from the enterprise coordination module 180 and/or policy and rules engine 164 in the enterprise system 108 that the requestor selection(s) comply with enterprise rules, policies, and/or infrastructure restrictions and/or other restrictions.

In decision diamond 448, the vendor coordination module 144 determines whether or not the proposed software transaction is compliant with one or more of the above requirements. When the transaction is not compliant, the vendor coordination module 144 causes the presentation module 124 to notify the requestor, in optional step 452, of the ground(s) or reason(s) of noncompliance. In optional step 456, the requestor can request, via the request module 172, and receive approval from enterprise IT personnel for a variance or exception.

In step 460, the vendor system 104 and requestor complete the transaction.

In step 464, the license manager 136 updates the licensing database 148 to reflect the completed transaction. The update includes not only licensing records but also infrastructure records, if any, regarding the requestor's enterprise. In one configuration, the vendor coordination module 144 notifies the enterprise coordination module 180 of the completed transaction so that the enterprise records in the licensing and enterprise databases 148 and 184 can be synchronized.

In optional step 468, the vendor or enterprise coordination module(s) 144 and 180, as appropriate, consider propagation of the requestor's selection(s) to other enterprise members.

Figure 5A:
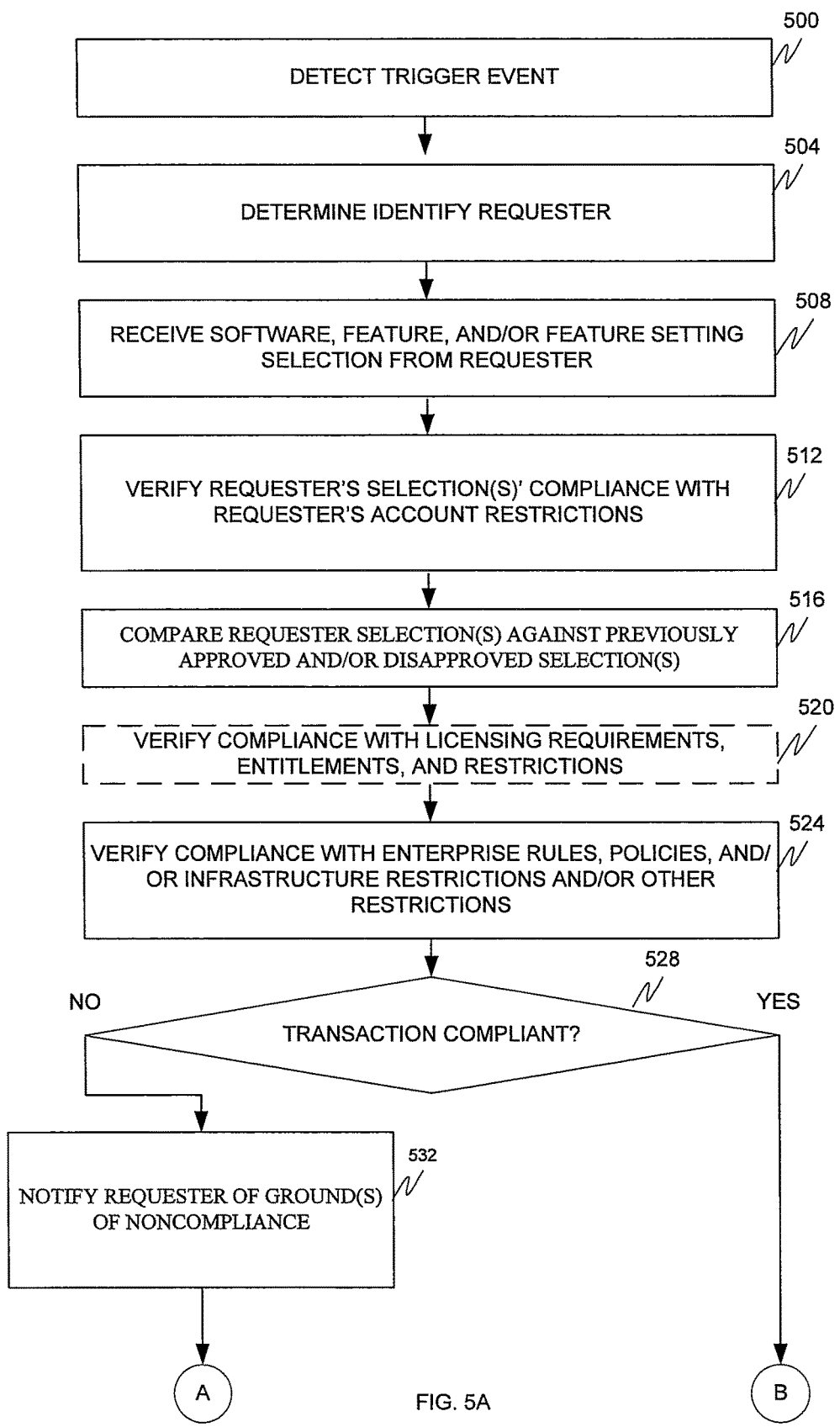
FIGS. 5A-B depict a process flow chart according to an embodiment.
Figure 5B:
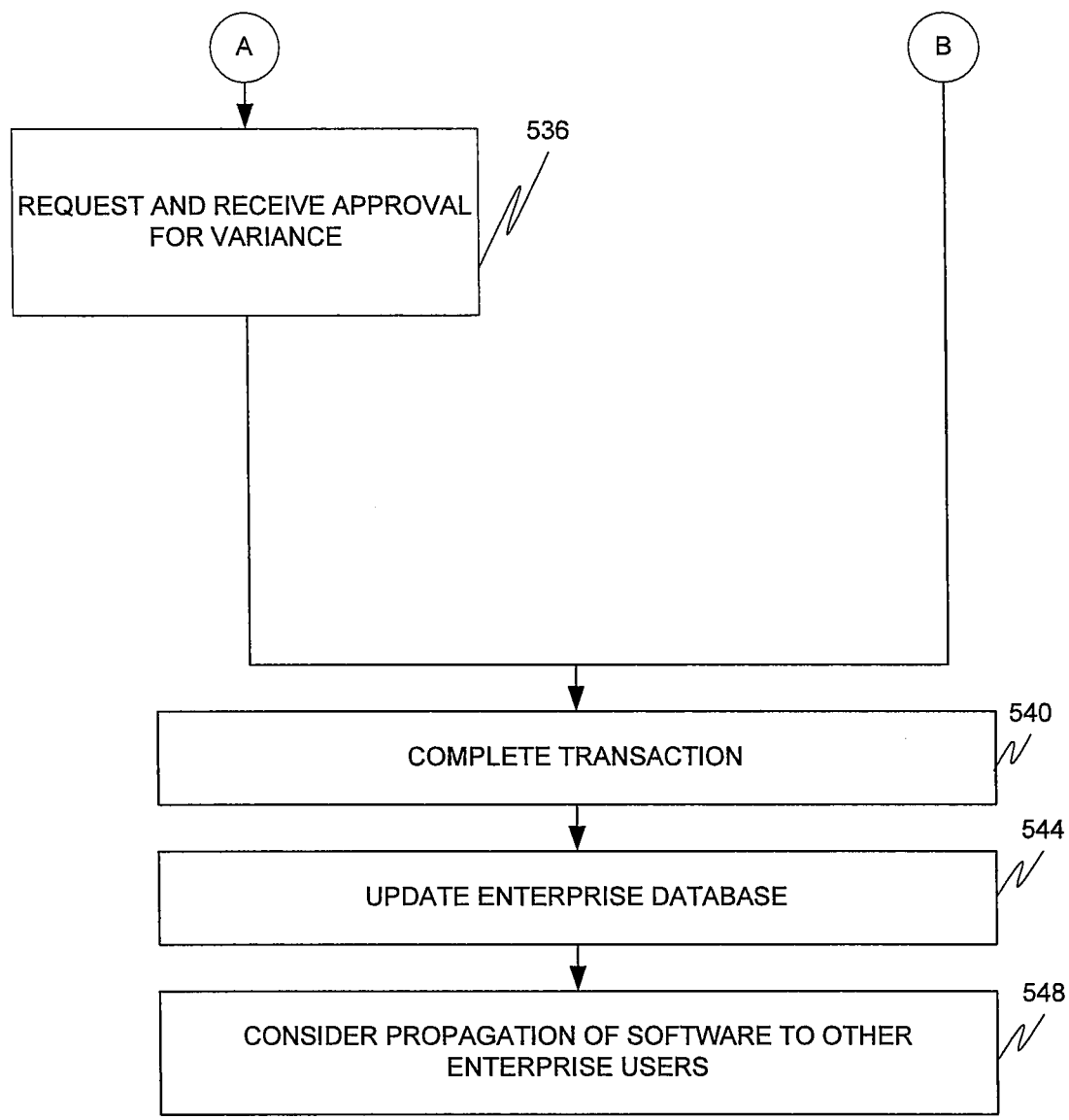

An embodiment of the operation of the vendor and enterprise systems 104 and 108 will now be discussed with reference to FIGS. 5A-B.

In step 500, the browser monitoring module 160 detects a trigger event, such as one of the events noted above.

In step 504, the enterprise login and authentication module 156 determines the identity of the requestor.

In step 508, the policy and rules engine 164 receives the software, software upgrade, feature, and/or feature setting selection(s) ("requestor selection(s)") from the requestor.

In step 512, the enterprise account management module 168 verifies the requestor selection(s)' compliance with requestor's account restrictions.

In step 516, the policy and rules engine 164 compares the requestor selection(s) against previously approved and/or disapproved requestor selection(s).

In optional step 520, the enterprise coordination module 180 verifies compliance of the requestor selection(s) with pertinent licensing requirements, entitlements, and restrictions.

In step 524, the policy and rules engine 164 verifies compliance of the requestor selection(s) with enterprise rules, policies, and/or infrastructure restrictions and other restrictions.

In decision diamond 528, the enterprise coordination module 180 determines whether or not the proposed transaction is compliant.

If noncompliant, the enterprise coordination module 180, in step 532, notifies the requestor of the ground(s) or reason(s) of noncompliance, and, in step 536, the request module 172, at the requestor's option, requests and receives approval for a variance or exception.

In step 540, the vendor system 104 and requestor are permitted to complete the transaction.

In step 544, the enterprise coordination module 180 causes the enterprise database 184 to be updated to reflect the completed transaction. The update includes not only licensing records but also infrastructure records, if any. In one configuration, the enterprise coordination module 180 notifies the vendor coordination module 144 of the completed transaction so that the enterprise records in the licensing and enterprise databases 148 and 184 can be synchronized.

In step 548, the enterprise coordination module 180 considers propagation of the requestor's selection(s) to other enterprise members.

The steps of FIGS. 4A-B and 5A-B can be performed in different embodiments or a common embodiment. In the latter case, the steps are performed substantially simultaneously and interactively by the vendor and enterprise systems 104 and 108.

The exemplary systems and methods of this invention have been described in relation to a software distribution architecture. To avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects thereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   detecting, by a microprocessor and based on an activity of a requestor's communication device, an initiation of a download of a software change from a server of a software vendor, wherein the software vendor server is distinct from an enterprise communication system associated with the requestor's communication device;
   comparing, by the microprocessor, criteria related to the enterprise communication system and customized for the enterprise communication system, with the software change to determine whether the software change should be permitted, wherein the criteria is not directed to threat prevention; and
   based on the comparing, applying, by the microprocessor, the following rules:
      when the software change is not compliant with the criteria, blocking downloading of the software change to the requestor's communication device; and
      when the software change is compliant with the criteria, permitting downloading of the software change to the requestor's communication device.

2. The method of claim 1, wherein the detecting the initiation of the download is based on an accessed Uniform Resource Locator associated with the software vendor.

3. The method of claim 1, wherein the criteria comprise enterprise information technology guidelines regarding software other than threat prevention, wherein the enterprise information technology guidelines are provided by the enterprise communication system and unknown to the software vendor.

4. The method of claim 3, wherein the software change is not compliant with the criteria, and further comprising:
   creating, by the microprocessor and on behalf of the requestor, a request that the software change be approved; and
   forwarding, by the microprocessor, the request to an information technology person's device for approval.

5. The method of claim 1, wherein, in the comparing, the criteria depend on a context of the requestor and wherein the requestor context is based on an enterprise satellite office associated with the requestor, a job title of the requestor, a job description of the requestor, a degree of importance of the requestor to the enterprise communication system, a work unit of the requestor, a person with whom the requestor has frequent contact, and a current computational device in use by the requestor.

6. The method of claim 1, wherein the comparison of the software change with the criteria comprises reviewing comparisons of previous software changes with the criteria.

7. The method of claim 1, wherein, in the comparing, the criteria depend on presence information of the requestor.

8. The method of claim 1, wherein the detecting the initiation of the download is based on an attempt to establish a secured communications channel by the requestor's communication device.

9. An enterprise communication system associated with a requestor's communication device, comprising:
   a processor and a computer-readable medium coupled thereto, the computer-readable medium comprising instructions in the form of modules that are executed by the processor, the modules comprising:
   a processor executable browser monitoring module that detects, based on an activity of the requestor's communication device, an initiation of a download of a software change from a server of a software vendor, wherein the software vendor server is distinct from the enterprise communication system; and
   a processor executable policy and rules engine that:
      compares criteria related to the enterprise communication system and customized for the enterprise communication system, with the software change to determine whether the software change should be permitted, wherein the criteria is not directed to threat prevention; and
      based on the comparing, applies the following rules:
         when the software change is not compliant with the criteria, blocking downloading of the software change to the requestor's communication device; and
         when the software change is compliant with the criteria, permitting downloading of the software change to the requestor's communication device.

10. The system of claim 9, wherein the the detecting the initiation of the download is based on a received webpage content.

11. The system of claim 9, wherein the criteria comprise license requirements between the software vendor server and the enterprise communication system.

12. The system of claim 11, wherein the software change is not compliant with the criteria, and wherein the modules further comprise:
   a processor executable request module that creates, on behalf of the requestor, a request that the software change be approved and forwards the request to an information technology person's device for approval, wherein the request comprises information about the software change, the criteria, and the requestor.

13. The system of claim 12, wherein, in the comparing, the criteria depend on a context of the requestor that comprises an enterprise satellite office associated with the requestor, a job title of the requestor, a job description of the requestor, a degree of importance of the requestor to the enterprise communication system, a work unit of the requestor, a person with whom the requestor has frequent contact, and an identification of the requestor's communication device; and wherein the information about the requestor further comprises the context of the requestor.

14. An enterprise communication system, comprising:
   an enterprise server coupled to an enterprise communication network and receiving input for processing a software change, wherein the enterprise server comprises a microprocessor and a computer-readable medium coupled thereto, the microprocessor receives instructions from the computer-readable medium and is programmed to:

detect, based on an activity of a requestor's communication device controlled by the enterprise server, an initiation of a download of a software change from a server of a software vendor, wherein the software vendor server is distinct from the enterprise communication system;

compare criteria related to the enterprise communication system and customized by the enterprise communication system, with the software change to determine whether the software change should be permitted, wherein the criteria is not directed to threat prevention;

based on the comparison, apply the following rules:
when the software change is not compliant with the criteria, block downloading of the software change to the requestor's communication device; and
when the software change is compliant with the criteria, permit downloading of the software change to the requestor's communication device.

15. The system of claim 14, wherein the microprocessor is further programmed to determine that the requestor intends to download the software change based on a cursor activity on the requestor's communication device, and displayed webpage content on the requestor's communication device.

16. The system of claim 14, wherein the comparison of the software change with the criteria further comprises reviewing comparisons of previous software changes, wherein the comparison depends on a context of the requestor that comprises an enterprise satellite office associated with the requestor, a job title of the requestor, a job description of the requestor, a degree of importance of the requestor to the enterprise communication system, a work unit of the requestor, a person with whom the requestor has frequent contact, and an identification of the requestor's communication device.

17. The system of claim 16, wherein the software change is not compliant with the criteria and the microprocessor is further programmed to:
create, on behalf of the requestor, a request that the software change be approved; and
forward the request to an information technology person's device for approval.

18. The system of claim 14, wherein, during the comparison, the criteria depend on a context of the requestor that is an enterprise satellite office associated with the requestor, a job title of the requestor, a job description of the requestor, a degree of importance of the requestor to the enterprise communication system, a work unit of the requestor, a person with whom the requestor has frequent contact, and a current computational device in use by the requestor.

19. The system of claim 18, wherein, during the comparison, the criteria further depend on presence information associated with the requestor.

20. The method of claim 3, wherein the software change is not compliant with the criteria, and further comprising:
creating, by the microprocessor, an option of an approved software change as an alternative to the software change; and
providing the option of the approved software change to the requestor's communication device;
wherein the approved software change is chosen, by the microprocessor, based on the enterprise information technology guidelines.

21. The method of claim 1, wherein the activity is a browser activity of the requester's communication device, and wherein the browser activity is limited based on the enterprise communication system associated with the requester.

22. The method of claim 1, wherein the software change is compliant with the criteria, wherein the requester is an authenticated member of the enterprise communication system, and wherein the microprocessor provides a billing account of the enterprise communication system to the requestor's communication device.

\* \* \* \* \*